(12) United States Patent
Rice

(10) Patent No.: US 6,364,991 B1
(45) Date of Patent: Apr. 2, 2002

(54) METHOD AND APPARATUS FOR CURING THE LINING OF A PIPE

(75) Inventor: Nigel Leonard Rice, Doncaster (GB)

(73) Assignee: Rice Associates, Doncaster (GB)

( * ) Notice: Subject to any disclaimer, the term of this patent is extended or adjusted under 35 U.S.C. 154(b) by 0 days.

(21) Appl. No.: 09/446,444

(22) PCT Filed: Jun. 18, 1998

(86) PCT No.: PCT/GB98/01631

§ 371 Date: Feb. 23, 2000

§ 102(e) Date: Feb. 23, 2000

(87) PCT Pub. No.: WO98/57789

PCT Pub. Date: Dec. 23, 1998

(30) Foreign Application Priority Data

Jun. 19, 1997 (GB) .............................................. 9712806

(51) Int. Cl.⁷ ........................ B29C 35/10; F16L 55/165
(52) U.S. Cl. .................... 156/275.5; 156/287; 156/293; 156/294; 156/379.8; 156/380.9; 156/391
(58) Field of Search ................................. 156/293, 294, 156/156, 287, 275.5, 391, 379.8, 380.9

(56) References Cited

U.S. PATENT DOCUMENTS

| | | | | |
|---|---|---|---|---|
| 4,495,808 A | * | 1/1985 | Fischer, III | ................ 73/866.5 |
| 5,121,644 A | * | 6/1992 | Grey et al. | ............... 254/134.4 |
| 5,622,570 A | * | 4/1997 | Lima et al. | ..................... 134/5 |
| 5,924,913 A | * | 7/1999 | Reimelt | ........................ 451/36 |

FOREIGN PATENT DOCUMENTS

| | | |
|---|---|---|
| CH | 676 029 A | 11/1990 |
| EP | 0 122 246 A | 10/1984 |
| GB | 1 205 170 A | 9/1970 |
| JP | 8-105588 A * | 4/1996 |
| JP | 8-150371 A * | 6/1996 |
| JP | 8-156093 A * | 6/1996 |
| WO | WO 92 16784 A | 10/1992 |
| WO | WO 96 11783 A | 4/1996 |
| WO | WO 96 18493 A | 6/1996 |

OTHER PUBLICATIONS

Patent Abstracts of Japan vol. 010, No. 234, Aug. 14, 1986 & JP 61 068226 A, Apr. 8, 1986.
Patent Abstracts of Japan vol. 096, No. 008, Aug. 30, 1996 & JP 08 105588 A Apr. 23, 1996.
Patent Abstracts of Japan vol. 018, No. 220, Apr. 20, 1994 & JP 06 015739 A Jan. 25, 1994.
International Search Report, Sep. 30, 1998, for PCT/GB98/01631.

* cited by examiner

Primary Examiner—Jeff H. Aftergut
(74) Attorney, Agent, or Firm—Merchant & Gould P.C.

(57) ABSTRACT

Curing method and apparatus for curing the lining (4) of a pipe (3) and which comprises a traveling frame (2) for introduction into the pipe (3), a curing device (8) mounted on the frame (2) and operative to cure the inner wall of the lining during travel of the frame along the pipe, and a fluid pressure driven propelling device (11) connected to the frame (2) and operative, upon application of fluid pressure to the pipe, to pull the frame along the pipe.

19 Claims, 2 Drawing Sheets

METHOD AND APPARATUS FOR CURING THE LINING OF A PIPE

Figure 1:
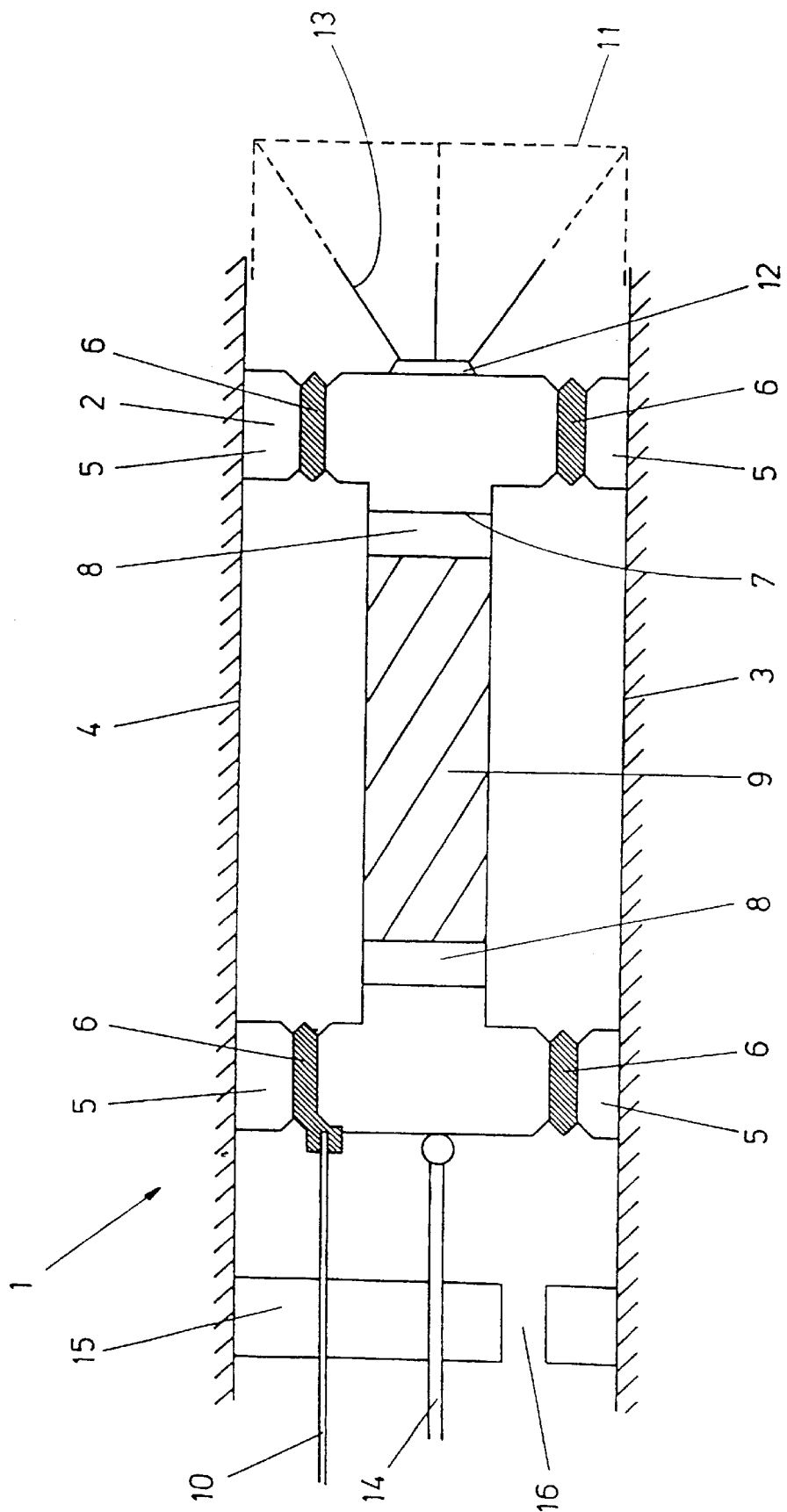

This invention relates to a method and apparatus for curing the lining of a pipe.

In this specification, reference to the lining of a pipe is intended to include many different types of pipe, and particularly underground pipes which may be pre-formed pipes subsequently installed underground, or pipes which are fabricated underground e.g. brick-lined sewers. Re-lining of existing pipes is a particularly convenient means of repairing existing pipes, conduits, pipelines and sewer walls.

It should be understood therefore that this invention has general application to the lining of pipes.

In certain applications, the lining of a pipe wall utilises a knitted glass fabric, optionally with granite or other filler material, plus a curable resin impregnated into the fabric. This type of lining material is particularly suitable for being taken around bends. The lining is then subsequently cured by use of a travelling curing apparatus. A typical known apparatus comprises a frame for introduction into the pipe, a curing lamp mounted on the frame, and a cord attached to the frame. The cord is passed along the pipe and is then used to pull the frame slowly through the pipe, and internally of the lining, thereby curing the lining as it travels. The curing lamp usually takes the form f an ultra-violet lamp, which is capable of curing the resin as the apparatus travels along the pipe.

However, heat is necessarily generated by the ultra-violet light, and in addition the curing action of the resin also generates heat, and these two factors can cause overheating of the lining, and with risk of combustion of the lining taking place.

In order to overcome this problem, pipelines are often filled with water before the curing apparatus is introduced The water acts as a coolant, but has the disadvantage of necessitating the use of expensive and potentially dangerous water proof ultra-violet lamps and associated electrical circuits.

The invention therefore seeks to provide method and apparatus for curing a lining of a pipe, having improved propelling means. Desirably, the improved propelling means also permits cooling of the internal wall of the lining during the curing process.

According to one aspect of the invention there is provided apparatus for curing the lining of a pipe and which comprises:

a travelling frame for introduction into the pipe;

a curing device mounted, or being capable of being mounted on the frame and operative to cure the inner wall of the lining during travel of the frame along the pipe; and a fluid pressure driven propelling device connected to the frame and operative, upon application of fluid pressure to the pipe, to pull the frame along the pipe.

The apparatus therefore is propelled along the length of the lining by any suitable fluid pressure mediums which acts on the propelling device, and simultaneously the pressure medium also can act as a coolant preventing overheating and possible combustion of the lining.

Preferably, compressed air is utilised as the fluid pressure driving medium, since air is an insulator, and this enables a relatively inexpensive curing device e.g. an ultra-violet lamp, to be utilised for the curing operation, ant there would be no need for an expensive and potentially dangerous electrically insulated lamp, for use in the event of a non insulating fluid pressure medium being utilised.

In use of known curing devices, it is necessary to have access to both ends of the pipe, enabling the device to be inserted at one end and pulled through the pipe to the other end. By contrast, apparatus according to the invention may be used when only one end of the pipe can be accessed. In this case, the apparatus is propelled from the open end to the closed end, and then pulled back to the open end by a cord attached to the Frame. One preferred form of fluid pressure driven propelling device comprises an inflatable parachute or drogue. The diameter of the parachute, when inflated, mass be arranged to be larger than the diameter of the pipe along which it is travelling. This is advantageous in that, when the parachute is inflated, the fluid pressure driving medium e.g. air is not free to pass from the high pressure side of the parachute to the low pressure side of the parachute. Therefore, all the pressurised air introduced into the pipe can be used to propel the apparatus along the pipe. If necessary, large pressures can be built-up behind the parachute, if the apparatus is proving particularly difficult to move.

However, in other circumstances, it may be desirable for the diameter of the inflated parachute to be less than the diameter of the pipe. This has the advantage that a portion of the fluid pressure medium e.g. compressed air, introduced into the pipe can be used to inflate that parachute and propel the frame, but still leaving a further portion of the medium to travel over the apparatus and the parachute, and also the curing device as well as the lining, and thereby dissipating any heat generated, and cooling the lining so as to minimise the risk of combustion.

In a further preferred arrangement, regardless of whether the parachute is oversized or undersized, when inflated, relative to the pipe, the parachute may be arranged to be semi-permeable relative to the fluid pressure driving medium. This has the advantage that a predetermined portion of the medium introduced into the pipe can pass through the parachute, thereby cooling the pipe lining, and With the remainder of the medium being used to inflate the parachute and propel the frame along the pipe. The ratio of the driving and Cooling portions of the medium introduced In to the pipe can be determined in advance, and will remain constant even if the diameter of the pipe changes.

Desirably, the travelling frame is adjustable in width, which enables the frame to be used in pipe linings of different diameter. The diameter of the frame may be adjusted such that the curing device e.g. an ultra-violet lamp, is always in the center of the pipe and does not lie at the bottom of large pipelines.

The frame may have wheels attached thereto to facilitate the motion of the frame along the pipe.

The frame may also carry a power source for powering the curing device.

The frame may also include a propeller to assist in inflation of the parachute. With such a propeller, there is no need for an external device connected to the end of the pipe for introducing the fluid pressure medium. Such a propeller may be useful in particularly long pipes where the volume of pressurised fluid to be introduced might be excessive, id the absence of the propeller.

An alternative embodiment of fluid pressure driven propelling device which may be connected to the frame may comprise a so-called pipeline "pig", of the type used in scraping and cleaning the internal walls of pipelines. Many designs of "pig" have been proposed, and particularly for use in cleaning, he walls of pipelines conveying hydrocarbons, and which include designs of pig which are particularly suitable for negotiating pipeline bends, and which may be particularly suitable for use in the apparatus of the invention.

According to a further aspect of the invention, there is provided a method of curing the lining of a pipe utilising an apparatus as defined above, and/or utilising any one or more of the preferred options referred to above.

Figure 2A:
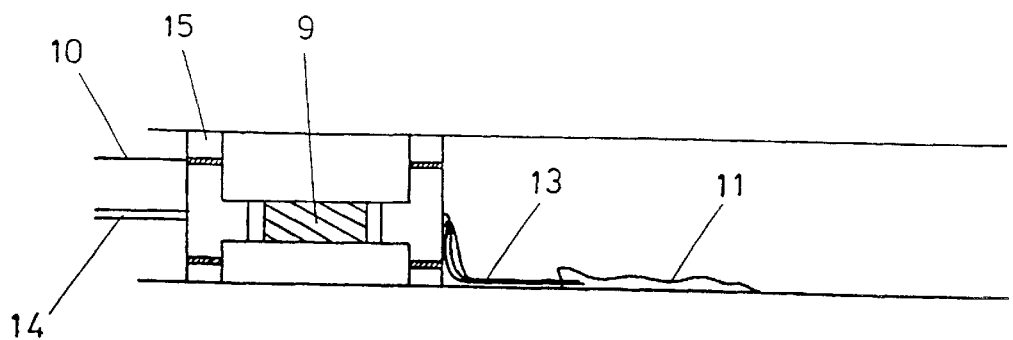
Figure 2B:
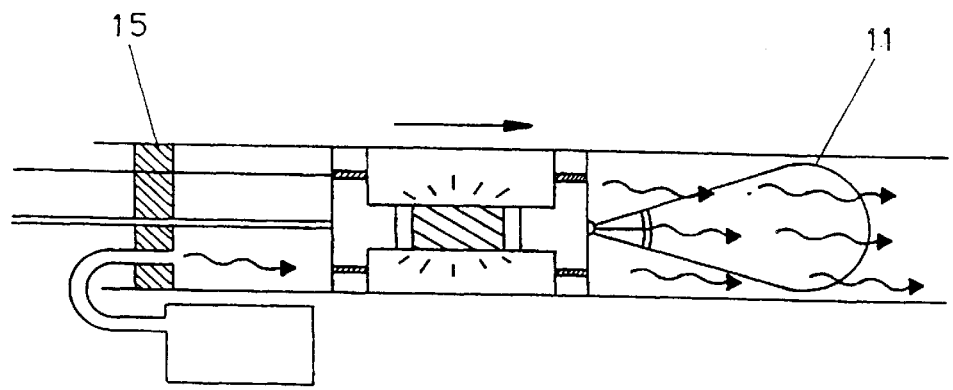
Figure 2C:
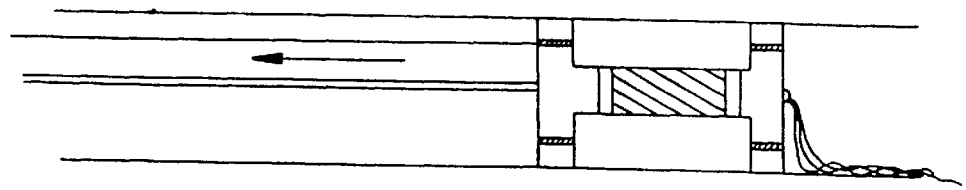

A preferred embodiment of the invention will now be described in detail, by way of example only, with reference to the accompanying drawings, in which:

FIG. 1 is a schematic illustration of a curing apparatus according to the invention, shown in cross section, and ready to travel along the internal wall of a lining of a pipe; and FIGS. 2a, 2b and 2c show schematically successive stages of use of the curing apparatus of FIG. 1 in order to cure the lining of a pipe.

Referring to FIG. 1, a curing apparatus according to the invention is designated generally by reference 1, and comprises a travelling frame 2 which can be introduced into a pipeline 3 having its internal walls pre-coated with a lining 4. The lining 4 may comprise a knitted fabric, optionally with granite or other fillers, and impregnated with a curable resin Linings of this type are particularly suitable for application to pipes having surface irregularities, damage, and particularly having pipe bends to be negotiated.

The travelling frame 2 includes laterally projecting arms 5, which have extendable joints 6, which allow the frame 2 to be adjusted in order to fit within the pipeline ?. Also, the adjustment of the frame can allow a frame cross member 7 to be arranged coaxially with respect to pipeline 3.

The cross member 7 may serve to mount any suitable type of curing device, and in which the preferred arrangement takes the form of an ultra-violet curing lamp 9. The cross member 7 therefore carries a socket 8 to which the lamp 9 can be connected. The lamp 9 is arranged so that it uniformly illuminates the surrounding wall of the lining 4 so that, during travel of the apparatus along the pipe, it is able simultaneously to cure the resin of the lining. The lamp 9 is therefore connected electrically to the socket 8, and which in turn is connected to a supply cable 10.

Attached to the end of the frame 2 remote from the power cable 10, there is arranged a fluid pressure driven propelling device which is capable, upon application of fluid pressure to the pipe, to pull the frame along the pipe. In the illustrated embodiment, the propelling device takes the form of a semi-permeable inflatable parachute 11 (shown schematically) which is attached to pulling hook or loop 12 by cables 13. In the illustrated embodiment, the parachute 11 has a slightly larger diameter, when inflated, than that of the pipeline 3.

A cord 14 is also attached to the frame 2 adjacent to the power cable 10. The cord 14 can be used to pull the frame 2 in an opposite direction along the pipeline 3 if required, as shown in FIG. 2c.

Both the power cable 10 and the cord 14 pass through a seal 15 which is inserted into the pipeline 3. The seal 15 has an entrance port 16 to which a source of fluid pressure driving medium 17, preferably compressed air, is attached.

In use, the ultra-violet lamp 9 is mounted on he frame 2, and the parachute 11 and the frame 2 are then introduced into the pipeline 3 with the parachute 11 remote from the entrance to the pipeline 3, as shown in FIG. 2a. The arms 5 of the frame 2 are adjusted until the ultra violet limp 9 is coaxial with the pipeline 2. The seal 15 is then threaded along the cord 14 and the power cable 10, and introduced into the pipeline 3, thereby sealing the end of the pipeline 3.

The entrance port 16 of the seal 15 is connected to a high pressure air source 17 which is used to inflate the parachute 12. However, the frame 2 is held in position by the tension in the cord 14.

As soon as the parachute has been correctly inflated, the ultra violet lamp 9 is activated, and a curing of the pipeline lining 4 commences. The tension in cord 14 is then reduced, and the inflated parachute 11 then slowly pulls the frame 2 along the pipeline 3, and simultaneously curing of the lining 4 takes place, as shown in FIG. 2b.

As the parachute 11 is semi-permeable, a portion of the high pressure air flows through the parachute 11 and along the pipeline 3. This cools the lining 4, thereby minimising the risk of combustion of the lining.

Once the frame 2 reaches the end of the pipeline 3, the source of pressurised air 17 is disconnected and the seal 15 is removed. The cord 14 is then used to pull the frame 2 back along the pipeline 4 to the entrance port 16. The frame is then removed, as shown in FIG. 2c.

However, while the illustrated embodiment utilises an inflatable parachute 11 as the fluid-pressure medium driven propelling device, it should be understood that other arrangements of propelling device may be utilised in the method and apparatus of the invention.

Thus, pipeline cleaning and scraping "pigs" may be used, which, as will be well known to those of ordinary kill in the art, are capable of being propelled along the inner wall of a pipeline by the application of fluid pressure to one side of he pig, and such a pig may therefore be used in place of the inflatable parachute 11. It is particularly preferred that pigs of the type capable of easily negotiating bends of pipelines be used in the apparatus of the invention.

What is claimed is:

1. A method of curing a lining of a pipe, the pipe comprising an entrance opening, using a curing apparatus comprising a travelling frame, a curing device mounted on the frame, and a fluid pressure driven propelling device connected to the frame, the propelling device comprising an inflatable parachute, the parachute being semi-permeable relative to a fluid pressure driving medium such that at least a portion of the fluid pressure driving medium flows through the parachute, the method comprising the steps of:

introducing the apparatus into the pipe;

applying power to operate the curing device; and applying fluid pressure to the pipe whereby the propelling device pulls the frame along the pipe such that the lining is cured during travel of the frame along the pipe.

2. A method according to claim 1, wherein the fluid pressure driving medium is air.

3. A method according to claim 1, further comprising the step of pulling the frame back to the entrance opening after the lining is cured.

4. A method according to claim 1, wherein a diameter of the parachute, when inflated, is larger than a diameter of the pipe.

5. A method according to claim 1, wherein a diameter of the parachute, when inflated, is less than a diameter of the pipe.

6. A method according to claim 1, wherein the travelling frame is adjustable in width, such that the frame is adapted to be used in pipe linings of different diameter.

7. A method according to claim 1, wherein the travelling frame is adjustable such that a position of the curing device relative to the lining is adjustable.

8. Apparatus for curing a lining of a pipe, comprising:

a travelling frame adapted for introduction into the pipe;

a curing device mounted on the frame and operative to cure an inner wall of the lining during travel of the frame along the pipe; and a fluid pressure driven propelling device connected ti the frame and operative, upon application of fluid pressure to the pipe, to pull the frame along the pipe;

wherein the propelling device comprises an inflatable parachute, the parachute being semi-permeable relative to a fluid pressure driving medium such that at least a portion of the fluid pressure driving medium flows through the parachute.

9. Apparatus according to claim 8, wherein a diameter of the parachute, when inflated, is larger than a diameter of the pipe.

10. Apparatus according to claim 8, wherein a diameter of the parachute, when inflated, is less than a diameter of the pipe.

11. Apparatus according to claim 8, wherein the travelling frame is adjustable in width, such that the frame is adapted to be used in pipe linings of different diameter.

12. Apparatus according to claim 8, further comprising wheels attached to the frame, the wheels being adapted to facilitate a motion of the frame along the pipe.

13. Apparatus according to claim 8, wherein the frame comprises a power source for powering the curing device.

14. Apparatus according to claim 8, wherein the frame comprises a propeller mounted thereon, the propeller being operative to at least partially inflate the parachute.

15. Apparatus according to claim 8, wherein the propelling device comprises a pipeline pig.

16. Apparatus according to claim 15, wherein the pig is adapted for negotiating pipeline bends.

17. Apparatus according to claim 8, wherein the curing device comprises an ultra violet lamp.

18. Apparatus according to claim 8, wherein the parachute is adapted to be driven by and is semi-permeable relative to air.

19. Apparatus according to claim 8, wherein the travelling frame is adjustable such that a position of the curing device relative to the lining is adjustable.

* * * * *